T. A. DE VILBISS.
MEDICINAL VAPORIZER.
APPLICATION FILED DEC. 6, 1915.

1,221,516.

Patented Apr. 3, 1917.

INVENTOR.
Thomas A. DeVilbiss,
By Owen, Owen & Crampton,
His attys.

UNITED STATES PATENT OFFICE.

THOMAS A. DE VILBISS, OF TOLEDO, OHIO, ASSIGNOR TO THE DE VILBISS MANUFACTURING CO., OF TOLEDO, OHIO, A CORPORATION OF OHIO.

MEDICINAL VAPORIZER.

1,221,516.          Specification of Letters Patent.      Patented Apr. 3, 1917.

Application filed December 6, 1915. Serial No. 65,435.

*To all whom it may concern:*

Be it known that I, THOMAS A. DE VILBISS, a citizen of the United States, and a resident of Toledo, in the county of Lucas and State of Ohio, have invented a certain new and useful Medicinal Vaporizer; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to medicinal vaporizers or fumigators of the character in which a fluid, preferably of a heated nature, as steam, is passed through, a medicinal preparation and saturated with the preparation before discharging into the atmosphere.

The object of my invention is the provision of an improved apparatus of the character described, which is simple and efficient in its construction and operation and adapted to effect a thorough and efficient vaporization of a medicinal preparation in liquid form.

The invention is fully described in the following specification, and while, in its broader aspect, it is capable of embodiment in numerous forms, a preferred embodiment thereof is illustrated in the accompanying drawings, in which,—

Figure 1:
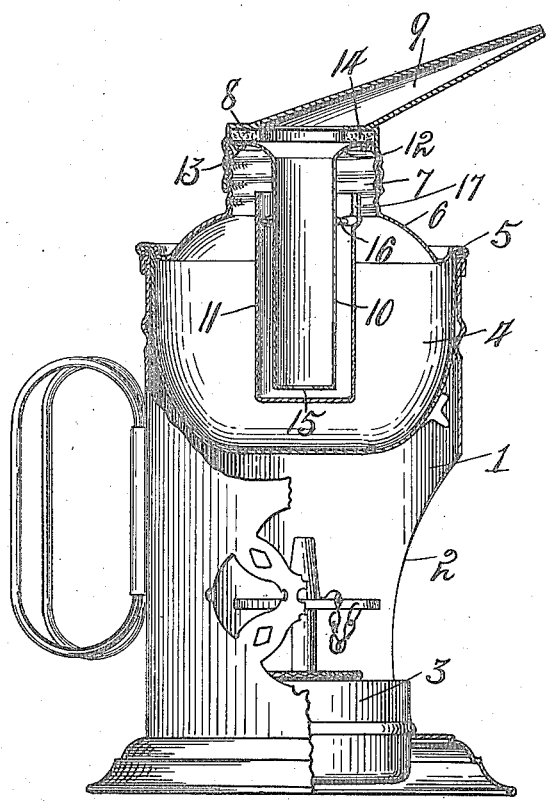
Figure 2:
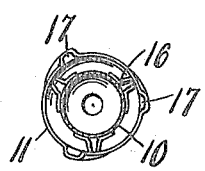

Figure 1 is a broken central sectional vertical view of an apparatus embodying the invention, and Fig. 2 is a sectional view of the container for the medicinal preparation which is to be vaporized.

Referring to the drawings, 1 designates a case, which forms the combustion chamber of the portable hand type, said casing being open at its top and having an opening 2 in its side through which a small lamp 3 for burning alcohol or other suitable material may be inserted or removed. The lamp 3 is intended to seat in the base portion of the combustion chamber.

Removably mounted in and closing the open top of the casing 1 is a boiler or receptacle 4 for containing water to be heated by the lamp 3, or other suitable heating means disposed within the lower portion of the casing, whereby steam may be generated in said boiler. The boiler 4 is preferably of suitable size to fit into the upper open end portion of the casing 1 and is provided at or adjacent its upper edge with an outwardly projecting flange 5 for seating on the upper edge of the casing 1 to limit the movements of the boiler therein. The boiler 4 is provided, in the present instance, with a top part 6, which is provided at its center with an upwardly extending tubular projection 7 that is open at its upper end and is threaded to receive a screw cap 8. This screw cap is provided on its top with a discharge nozzle 9, which opens into the interior of the boiler.

Suspended within the boiler 4 from the upper portion thereof is a receptacle for containing the medicinal preparation to be vaporized. This receptacle is of double chamber form and comprises the inner cup member 10 and the outer cup member 11. The cup member 10, in the present instance, has its upper end provided with an outwardly flaring or projecting flange 12 which rests on an inturned slightly countersunk flange or ledge 13 at the uper end of the tubular extension 7 of the boiler top, whereby the cup member 10 is suspended within the boiler from the top of said extension 7. The cup 8 is provided with an internal ring gasket 14, which, when the cap is screwed down on the extension 7, bears against the flange 12 and forms a close joint with said flange and also holds it to its seat. The outer cup member 11 surrounds and is carried by the cup member 10 and forms a chamber around and below the cup member 10, which chamber opens at its top into the interior of the boiler 4 at its uper portion. The cup member 10 has an opening 15 in its bottom portion to provide communication between the interiors of the inner and outer cup members so that a liquid placed within the inner cup member will also flow into and assume the same level in the outer cup member.

It is evident that the flanged upper end of the cup member 10, when held seated on the flange 13 of the extension 7 by the cap 8 and gasket 14 prevents the escape of steam from the interior of the boiler 4, except through the members 10 and 11 and thence out through the nozzle 9, which is in communication with the upper open end of the cup member 10.

It is also evident that the steam in its passage through a liquid contained in the cups 10 and 11 becomes thoroughly saturated with such liquid so that the liquid is discharged from the nozzle 9 in vapor form with the steam.

While the cup members 10 and 11 may be connected in any suitable manner they are shown, in the present instance, as being removably connected by providing a plurality of studs 16 on the outer side of the member 10 for insertion into registering grooves 17 of bayonet form provided in the upper end of the member 11. The inner horizontal end portions of the grooves 17 are gradually diminished in depth to cause a tightening of the stud 16 with respect to the groove walls when the studs and grooves are being turned into holding engagement.

It is apparent that I have provided a very simple and efficient form of vaporizer, the parts of which may be readily separated for the purpose of cleaning.

While I have herein shown and described one specific embodiment of my invention for illustrative purposes, and have disclosed and discussed in detail the construction and arrangement incident to one specific application thereof, it is to be understood that the invention is not limited to the mere detail or relative arrangement of the parts, but that deviations from the illustrated form or embodiment of the invention may be made without departing from the spirit of the claims.

Having thus described my invention, what I claim as new, and desire to secure by Letters Patent, is,—

1. In a vaporizer of the class described, a boiler, a nozzle projecting from the upper end of said boiler, a cup member suspended within said boiler and having its top portion closed to the interior of the boiler and open to said nozzle, a second cup member disposed within the boiler and having its upper end in communication with the upper interior portion of the boiler and its lower end in communication with the lower end of said first cup member to cause steam to pass through said members to find an exit from the interior of the boiler to said nozzle.

2. In a vaporizer of the class described, a boiler, means for heating said boiler, a nozzle projecting from the upper end portion of the boiler, means disposed within the boiler and forming an angular passage having vertically disposed parts for containing a liquid, one end of said passage opening into the upper end portion of the boiler above the lower portion of said means and the other end of said passage being in communication only with the nozzle passage, said means closing the communication between the interior of the boiler and said nozzle except therethrough.

3. In a vaporizer of the class described, a boiler having a top opening, heating means for said boiler, a cup member suspended within the boiler with its open upper end in communication with the top opening, a second cup member carried by and inclosing a portion of said first member, said second cup member having its upper end in communication with the upper portion of the boiler and its lower end in communication with the lower end of the first cup member to permit the passage of steam successively through said members, and a nozzle coöperating with said first cup member to close the top opening of the boiler and having its discharge orifice in communication with the interior of said first member.

4. In a vaporizer of the class described, a boiler having a top opening, a cap for closing said opening and forming a discharge nozzle, a double chambered liquid receptacle suspended within the boiler from the top thereof and retained in position by said cap member, said receptacle comprising two separably connected members which have communication one with the other and coöperate to form an angular passage which opens at one end into the upper portion of the boiler and at its other end into said nozzle, said receptacle also closing communication between the boiler and nozzle except through the receptacle.

In testimony whereof, I have hereunto signed my name to this specification.

THOMAS A. DE VILBISS.